US012068699B2

(12) United States Patent
Pmsvvsv et al.

(10) Patent No.: US 12,068,699 B2
(45) Date of Patent: Aug. 20, 2024

(54) MICROGRID INVERTER CONTROLLER AND INVERTER FAULT CURRENT CONTROL METHOD

(71) Applicant: BLOOM ENERGY CORPORATION, San Jose, CA (US)

(72) Inventors: Prasad Pmsvvsv, San Jose, CA (US); Kaushal Biligiri, San Jose, CA (US); Beau Baker, San Jose, CA (US); Mehdi Ebad, San Jose, CA (US); Vignan Reddy Bommireddy, San Jose, CA (US); Andrew Hurt, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/501,494

(22) Filed: Nov. 3, 2023

(65) Prior Publication Data

US 2024/0162838 A1 May 16, 2024

Related U.S. Application Data

(60) Provisional application No. 63/382,142, filed on Nov. 3, 2022.

(51) Int. Cl.
*H02M 7/5387* (2007.01)
*H02H 1/00* (2006.01)
(Continued)

(52) U.S. Cl.
CPC ...... *H02M 7/53873* (2013.01); *H02H 1/0015* (2013.01); *H02M 1/088* (2013.01); *H02M 7/537* (2013.01)

(58) Field of Classification Search
CPC ............ H02M 7/537; H02M 7/53873
See application file for complete search history.

(56) References Cited

U.S. PATENT DOCUMENTS 10,868,425 B1 12/2020 Porter et al.
10,928,794 B2 * 2/2021 Bennett ............... G05B 19/042
(Continued)

FOREIGN PATENT DOCUMENTS

CN 104410097 B 3/2015
CN 110943483 A 12/2021

OTHER PUBLICATIONS

Static Modeling of Microgrids for Load Flow and Fault Analysis, IEEE Transactions On Power Systems, Bulent Dağ, Ali Rifat Boynueğri, Yavuz Ateş, Arif Karakaş, Abdullah Nadar, and Mehmet Uzunoğlu vol. 32, May 2017.
(Continued)

*Primary Examiner* — Gary A Nash
(74) *Attorney, Agent, or Firm* — Evergreen Valley Law Group; Kanika Radhakrishnan

(57) ABSTRACT

A method includes outputting an alternating current (AC) waveform from an inverter module to a plurality of loads, outputting a fault waveform from the inverter module to a first load of the plurality of loads in response to a fault condition associated with the first load, and outputting the AC waveform from the inverter module to at least some of the plurality of loads if the fault condition is cleared before a recovery period expires or disconnecting the inverter module from the plurality of loads if the fault condition is not cleared before the recovery period expires.

20 Claims, 14 Drawing Sheets

(51) Int. Cl.
*H02M 1/088* (2006.01)
*H02M 7/537* (2006.01)

(56) References Cited

U.S. PATENT DOCUMENTS

| | | | | |
|---|---|---|---|---|
| 2011/0216562 A1* | 9/2011 | Gengenbach | ......... | H02M 1/126 |
| | | | | 363/71 |
| 2011/0301772 A1* | 12/2011 | Zuercher | ........... | H01L 31/02021 |
| | | | | 700/292 |
| 2014/0139260 A1* | 5/2014 | Shankar | .................. | H02M 1/32 |
| | | | | 363/55 |
| 2015/0364985 A1* | 12/2015 | Lee | ....................... | H02M 5/458 |
| | | | | 363/37 |
| 2017/0250568 A1* | 8/2017 | Gross | ....................... | G06F 1/263 |
| 2019/0052075 A1* | 2/2019 | Dent | .......................... | H02J 3/04 |
| 2021/0152016 A1* | 5/2021 | Pmsvvsv | ................. | H02J 9/061 |

OTHER PUBLICATIONS

Review of microgrid protection strategies: current status and future prospects , TELKOMNIKA Telecommunication Computing Electronics and Control , Zaid Alhadrawi, Mohd Noor Abduallah, Hazlie Mokhlis , vol. 20, No. 1, Feb. 2022, p. 173-184.

* cited by examiner

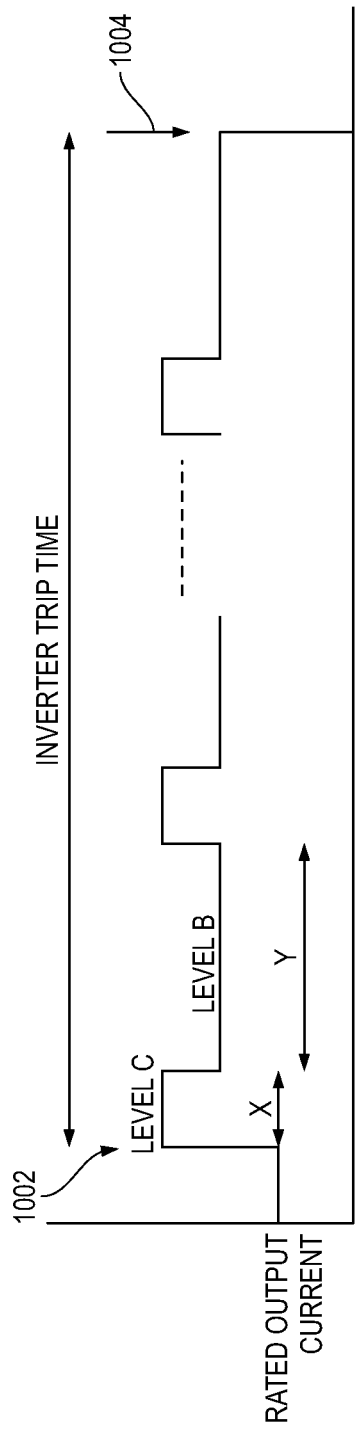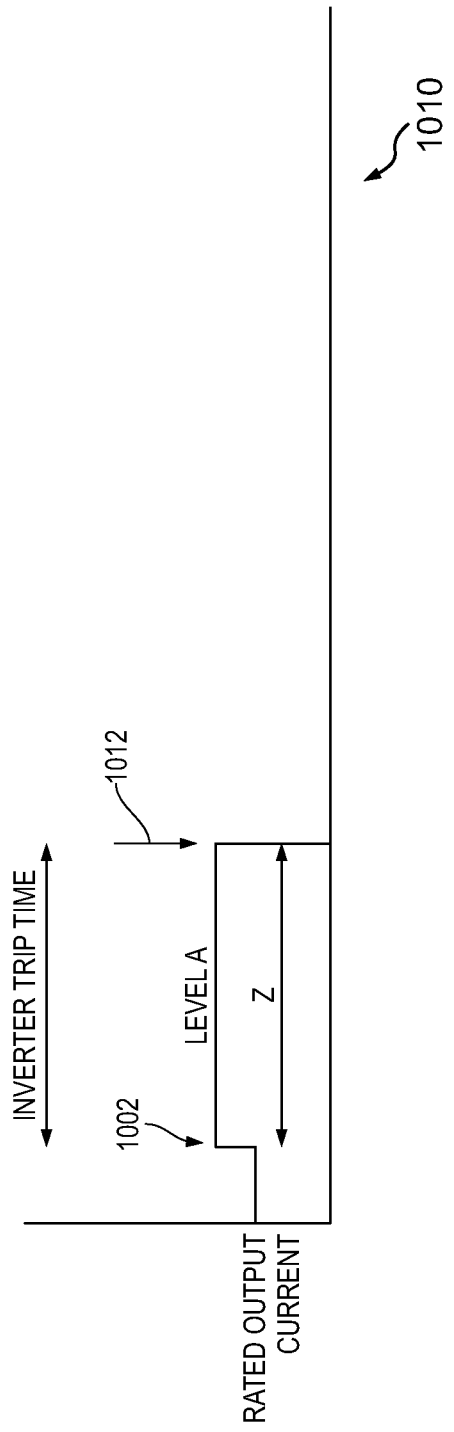
FIG. 10A
FIG. 10B

MICROGRID INVERTER CONTROLLER AND INVERTER FAULT CURRENT CONTROL METHOD

TECHNICAL FIELD

The present disclosure relates generally to microgrids and, more particularly, to a method of fault current control and management for an inverter-based microgrid.

BACKGROUND

A microgrid can comprise a group of interconnected loads and distributed energy resources (DERs) within defined electrical boundaries that act as a single controllable entity with respect to a main power grid. For example, a microgrid may include a local power generator, a load, a load management controller, a grid isolation switch, and a switch controller.

A microgrid can operate in a grid mode where the microgrid is electrically connected to the main power grid, and can operate in an island mode where the microgrid is disconnected from the main power grid and the microgrid is powered by a local power generator only.

Microgrids can be interfaced through DERs, such as fuel cell systems, wind turbines, solar photovoltaics (PV), and micro turbines, utilizing power electronics. The fundamental building blocks of power electronics include semiconductor-based switching devices such as transistors and thyristors, which are most commonly used to create or convert voltage and current waveforms. For DER applications, the most common power electronics systems are inverters and converters.

During the implementation phase, inverters are configured with current limits for the current they supply. These limits pertain to both the magnitude and duration of the current, especially under various abnormal conditions like overloads, short circuits, and the activation of high inrush current loads. These specifications adhere to a time-current curve or predefined thresholds that, when exceeded, cause the inverters to cease switching and delivering current. The upper bounds of these current and time thresholds are determined by the inverter hardware's ability to handle faults, while the lower limits are determined by the inverter's capability to handle overload, short circuit ride-through requirements, and minimum inrush current capacity.

When inverters are employed to protect electrical loads from disruptions or disturbances in the grid, transfer switches are utilized. These transfer switches serve as a means to switch between the electrical grid and the inverter. The transfer switch plays a crucial role in ensuring a seamless and rapid transition between grid power and the inverter's power output. This allows for uninterrupted power supply to connected loads, even when the grid experiences disturbances, outages, or other issues. The transfer switch essentially acts as a bridge, enabling reliable and continuous power for the protected loads by swiftly switching between the grid and the inverter as needed.

During a fault condition, the inverters can supply fault current up to a predefined threshold. Beyond this threshold, the transfer switch switches back to the grid, which can deliver the necessary fault current to operate the primary protection device and clear the fault. Once the fault is resolved, the transfer switch switches back to the inverter, and the loads are powered through the inverter again. Thus, the overall system ensures continuity of supply to critical loads, as long as the utility grid is available. However, this mechanism is not applicable when operating in isolated microgrids, where utility grid access is not present.

In isolated microgrids, transferring the fault from one source to another using a standard transfer switch can lead to reduced transfer switch lifespan and premature failure. In such cases, the inverter supplies a short-circuit current to the fault until it trips. The fault persists because the fault current is insufficient to activate a protection device, such as a protective relay (i.e., to open a circuit breaker located on the electrical bus connected to the fault location). As a result, the fault will continue to be present until the inverter trips, which could take up to a few seconds. In other words, instead of opening a circuit breaker and isolating the fault location of the electrical circuit while permitting the inverter to provide the designed operating current to the remainder of the electrical circuit, the inverter shuts off (i.e., trips) to prevent overheating from the high current caused by the fault (e.g., when a short circuit fault causes a low resistance in the circuit, which leads to a high output current on the inverter). Thus, the entire circuit loses current output from the inverter. The inverter does not trip immediately because it typically cannot distinguish between a short circuit and an inrush current, so it attempts to "ride through" the inrush period. Also, it is typically not possible to identify the fault location in a typical circuit, because the duration of the fault is not sufficient to activate the overcurrent protection device at the fault location.

Another challenge of inverter design is to reduce the available arc flash incident energy in the inverter. Since the amount of short circuit current supplied by the inverter is quite low compared to any rotating machine, inverter designers are often required to increase the duration of fault current for over-current protection devices (OCPDs) to act, such as fuses and/or relays/circuit breakers. This increase in fault current duration increases the incident energy which requires special considerations during maintenance. Despite this longer period of short circuit current, the combination of fault current level and duration may still fall short of the over-current protection device requirements.

Therefore, there is a need for an improved method of fault current control and management for an inverter-based microgrid.

SUMMARY

Various embodiments of the present disclosure provide a method of fault current control and management for an inverter-based microgrid.

In one embodiment, a method of controlling fault current is provided. The method includes outputting an alternating current (AC) waveform from an inverter module to a plurality of loads, outputting a fault waveform from the inverter module to a first load of the plurality of loads in response to a fault condition associated with the first load, and outputting the AC waveform from the inverter module to at least some of the plurality of loads if the fault condition is cleared before a recovery period expires or disconnecting the inverter module from the plurality of loads if the fault condition is not cleared before the recovery period expires.

In another embodiment, a system for controlling fault current is provided. The system includes an inverter module, a plurality of overcurrent protection devices (OCPD) electrically connected to the inverter module and configured to be connected to a respective plurality of loads, wherein a first OCPD of the plurality of OCPDs is configured to be associated with a first load of the plurality of loads, and a controller configured to control the inverter module: to output an alternating current (AC) waveform from the inverter module to the plurality of loads, output a fault waveform from the inverter module to the first OCPD in response to a fault condition associated with the first load, and output the AC waveform from the inverter module to at least some of the plurality of loads if the fault condition is cleared before a recovery period expires or disconnect the inverter module from the plurality of loads if the fault condition is not cleared before the recovery period expires.

According to various embodiments, a method includes detecting whether a fault has occurred in an electrical circuit connected to an inverter, generating a first signal to set a current limit level of the inverter to a first predefined level for a first predefined period, the current limit level indicating a maximum amount of current supplied by the inverter under fault conditions. The method further includes generating a second signal to set the current limit level of the inverter to a second predefined level for a second predefined period. The second predefined level is less than the first predefined level. The method further includes transmitting the first signal and the second signal to the inverter.

The method may also include determining a count of consecutive instances when a current level of the inverter reaches the first predefined level, and transmitting a trip signal to the inverter if the count of the consecutive instances for the current level of the inverter exceeds a predetermined value, the trip signal facilitating tripping of the inverter from the electrical circuit.

BRIEF DESCRIPTION OF THE DRAWINGS

The following detailed description of illustrative embodiments is better understood when read in conjunction with the appended drawings. For the purpose of illustrating the present disclosure, exemplary constructions are shown in the drawings. However, the present disclosure is not limited to a specific device, or a tool and instrumentalities disclosed herein. Moreover, those in the art will understand that the drawings are not to scale.

FIG. 10A illustrates a Root Mean Square (RMS) current plot showing inverter module current limit levels and trip time during a short circuit condition when the ERMS mode is not enabled, according to various embodiments of the present disclosure;

FIG. 10B illustrates an RMS current plot showing inverter module current limit levels and trip time during a short circuit condition when the ERMS mode is enabled, according to various embodiments of the present disclosure;

DETAILED DESCRIPTION

Figure 1A:
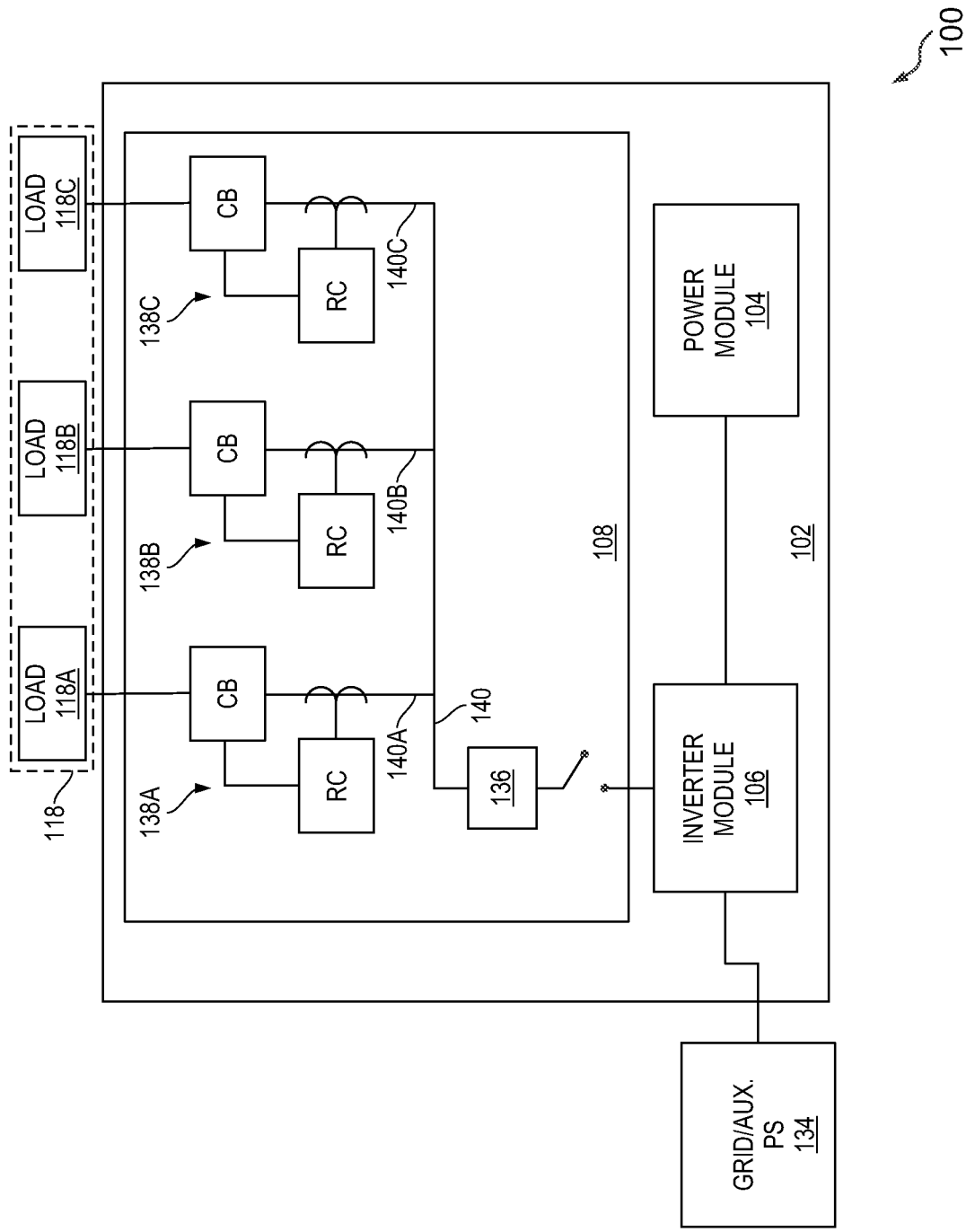
FIG. 1A is a schematic illustrating an environment illustrating an electrical architecture of a microgrid power system related to at least some example embodiments of the present disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint. Also, as would be apparent to one of ordinary skill in the art, the component "connections" described in the present disclosure are intended to refer to "electrical connections" unless otherwise specified.

Herein, a "current cycle" may refer to an alternating current (AC) current cycle, such as a 60 Hertz AC current cycle.

Unless otherwise expressly stated, it is in no way intended that any method set forth herein be construed as requiring that its steps be performed in a specific order. Accordingly, where a method claim does not expressly recite an order to be followed by its steps or it is not otherwise specifically stated in the claims or descriptions that the steps are to be limited to a specific order, it is in no way intended that any particular order be inferred.

The terms "grid", "public grid", "electrical grid", "main grid", "power grid", and "electrical power grid" are generally used interchangeably throughout the description, and they refer to an interconnected network of one or more components for electricity delivery from producers such as power stations to user loads. The components may include energy sources, electric substations, an electrical power transmission system, an electrical power distribution system, and the like. The grid may vary in size and can cover large areas such as one or more cities or states.

The term "microgrid" refers to a local electrical grid with defined boundaries, acting as a single and controllable entity that is usually attached to a main grid but is also able to function independently.

The term "inverter source" refers to a combination of an inverter and a corresponding electrical source connected to the inverter in the grid or the microgrid.

The term "grid-following mode" or "grid-tie mode" refers to a mode of operation of an inverter in a power conversion unit receiving power from a distributed energy source (e.g., a fuel cell system), in which the inverter tracks a voltage angle of the grid or the microgrid via an inverter controller to control an output (synchronizing to the grid or the microgrid) of the inverter.

The term "grid-forming mode" or "island mode" refers to a mode of operation of an inverter in a power conversion unit receiving power from a distributed energy source (e.g., a fuel cell system), in which the inverter actively controls the frequency and voltage output of the inverter independent of the grid via an inverter controller.

The term "power conversion unit" refers to an electrical circuit that changes the electric energy from one form to another form for a specific load.

The term "inverter" refers to an electronic device that changes Direct Current (DC) to Alternating Current (AC).

The term "inverter controller" refers to a controller that controls an operation of the inverter for regulating an output of the inverter to match certain conditions using feedback.

The term "fuel cell system" refers to systems containing electrochemical cells that convert the chemical energy of a fuel (often hydrogen) and an oxidizing agent (often oxygen) into electricity through a pair of redox reactions.

The terms "load", "electric load", and "consumer load" may be used interchangeably throughout the description, and they refer to any component of a circuit that consumes power or energy.

The "current limit level" or "current level command" can be defined as a maximum current supplied by an inverter during a fault condition such as a short circuit fault.

The terms "grid faults", "faults", "electrical faults", and "microgrid faults" may have been used interchangeably throughout the description, and they refer to an abnormal condition that causes a circuit element in the grid or the microgrid to fail to perform in an expected manner due to disruption in the flow of electric current. A fault in an electrical power system is the unintentional conducting path (short circuit) or blockage of current (open circuit), as described in J. Keller, et al., "Understanding Fault Characteristics of Inverter-Based Distributed Energy Resources", NREL Technical Report, NREL/TP-550-46698 January 2010, incorporated herein by reference in its entirety. It may be noted that faults can lead to electrical outages, equipment damage, and safety hazards. Different types of faults may include short circuit faults, ground faults, open circuit conditions, overload conditions, voltage sags or swells, etc.

The term "grid-forming mode" refers to a mode of operation of an inverter in a power conversion unit receiving power from a distributed energy source (e.g., a fuel cell system), in which the inverter actively controls the frequency and voltage output of the inverter independent of the grid via an inverter controller.

The term "grid-forming inverter" refers to a combination of a power conversion unit and the corresponding connected source, when actively controlling the frequency and voltage output independent of the main grid.

OVERVIEW

Various embodiments of the present disclosure provide a method of fault current control and management for an inverter-based microgrid.

A fault can occur when one energized electrical component contacts another at a different voltage, such that the impedance between the two electrical components drops, resulting in an overcurrent flowing along an undesired path. The impedance of the faulted path determines the magnitude of the overcurrent, which may range from currents slightly higher than a normal operating current (e.g., normal alternating current, "AC"), in cases of overheating, up to orders of magnitude larger than the normal operating current, in the case of short circuits. A short-circuit fault current can contain destructive energy (e.g., heat and magnetic forces), that can damage electrical equipment and pose safety concerns for both utility and non-utility personnel.

Primary protective devices for electrical power systems, such as protective relays, are designed to quickly detect and remove faults, by electrically disconnecting any electrical equipment associated with the power system, when a short circuit fault occurs, or when the power system begins operating in abnormal conditions. Protective relays determine when the appropriate circuit breaker tripping action should take place. The mechanical device capable of disconnecting the faulty element and physically isolating the electrical power system from short circuit disturbances is called a circuit breaker.

A protective relay receives information about the electrical distribution system (EDS) (such as voltage, current, and frequency) through current and voltage transformers. These transformers transform the measured voltage and current value to a more appropriate power level to be utilized by the protective relay. This information is processed by the protective relay and reacts to any abnormal conditions detected. Each protective relay is set or programmed for the desired tripping time (i.e., time delay for relay coordination and system reliability purposes). The decision to trip open or close the circuit breaker can be made by relay logic algorithms stored in a system controller and/or relay controller.

For electrical networks that draw power from a utility electrical grid, fault currents are sourced from the power utility, and are limited by ratings of an upstream transformer. Power generators in electrical networks are designed to deliver the necessary fault current, in order for a primary protection device to sense and operate under faults. The utility grid, owing to the presence of rotating machines, has the ability to source currents in the kilo-amp range for a few cycles, thereby giving adequate time for a protective relay to operate. For example, once a circuit breaker receives a trip signal from a relay, the typical fault clearing times can be anywhere from 2 to 9 cycles, depending on the type of circuit breaker.

Distributed energy resources (DER), such as fuel cell systems, wind turbines, solar photovoltaics (PV), and micro turbines, generally utilize power electronics to interface with a utility grid and/or a local electrical distribution network, such as a microgrid. The fundamental building blocks of power electronics include semiconductor-based switching devices such as transistors and thyristors, which are most commonly used to create or convert voltage and current waveforms. For DER applications, the most common power electronics systems are inverters and converters. The benefits of power electronic switches include switching speed, package size, and the ability to be finely controlled by other electronic systems and software.

Various example embodiments of the present disclosure provide microgrid inverter controllers and inverter fault current control in a microgrid-based site. The microgrid-based site includes an electric network of a main grid and one or more microgrids connected to the main grid through an AC bus. Each microgrid can be operated in a grid-tie mode or an island mode. The microgrid can include multiple power conversion units connected in parallel and delivering alternating current (AC) power. In the microgrid, power conversion units are connected to a microgrid bus. Each power conversion unit may include power electronic devices such as inverters. In the case of a DC source, the power conversion unit may also include an inverter (also referred to as a "microgrid inverter") to convert DC power to AC power. Thus, microgrid inverters with DC sources are connected to the microgrid bus, and deliver AC power through the microgrid bus. In other words, DC power sources such as solid oxide fuel cell systems (SOFC), solar power systems, wind power systems, etc., are connected to the microgrid bus through the corresponding microgrid inverters and deliver AC power to loads. Each microgrid inverter is controlled by an inverter controller. In an example, the inverter controller may generate a control signal with the required duty cycle and frequency to achieve the desired electrical parameters such as voltage, current, frequency, phase angle, and so on.

Further, the inverters in the power conversion units may be operated as voltage source inverters to form grid-forming inverters or current source inverters to form grid-following inverters. Each of the microgrid inverters includes one or more inverter controllers configured to control one or more electrical parameters of the associated microgrid inverter. An inverter controller may be implemented by, for example, hardware, firmware, processor, circuitry, and/or a computing device associated with the execution of software that includes one or more computer program instructions. In an example based on one or more control signals, the inverter controller may be configured to generate a pulse width modulation (PWM) signal with an appropriate duty cycle and frequency to change electrical parameters such as voltage magnitude, phase angle, current magnitude, etc. The shape of the waveform of the control signal generated by the inverter controller can comprise shapes such as sinusoidal, triangular, and so on.

Inverters are based on three fundamental technology areas: power semiconductor devices; microprocessor and digital signal processor technologies; and control and communications algorithms. An inverter-based power generator's peak current supply capability is generally set according to a switching semiconductor device's thermal characteristics. As a result, peak currents that can be sourced by the inverters for faults downstream are limited by the manufacturer of the inverter. Hence, faults may prevent an inverter from supplying adequate current to operate a protective relay, resulting in an inability to clear a fault and more often than not, trip an inverter, powering down all connected loads. For inverters operating in isolated microgrids, this may result in a blackout condition.

Most faults are temporary in nature (e.g., a lightning strike). Power systems may be designed to open a line circuit in an attempt to clear the fault and then automatically reclose the line to reconnect the circuit once the fault has cleared. There is a delicate balance between disconnecting for permanent faults and having the ability to "ride through" temporary faults.

Inverters do not dynamically behave the same as synchronous or induction machines. Inverters do not have a rotating mass component; therefore, they do not develop inertia to carry a fault current based on an electromagnetic characteristic. Inverters have a much faster-decaying envelope for fault currents because these devices lack predominantly inductive characteristics that are associated with rotating machines. These characteristics dictate the time constants involved with the circuit. Inverters can be controlled in a manner unlike rotating machines because they can be programmed to vary the length of time it takes them to respond to fault conditions. These features may also impact the fault current characteristics of the inverter.

During the implementation phase, inverters are configured with current limits for the current they supply. The upper bounds of these current and time thresholds are determined by the inverter hardware's ability to handle faults, while the lower limits are determined by the inverter's capability to handle overload, short circuit ride-through requirements, and minimum inrush current capacity.

When inverters are employed to protect electrical loads from disruptions or disturbances in the grid power supply, transfer switches are utilized. However, in isolated microgrids, transferring the fault from one source to another using a standard transfer switch can lead to reduced transfer switch lifespan and premature failure. In such cases, the inverter supplies a short-circuit current to the fault until it trips. The fault persists because the fault current is insufficient to activate the protection device, and it may take a few seconds for the inverter to trip. The inverter does not trip immediately because it cannot distinguish between a short circuit and an inrush current, so it attempts to ride through the inrush period. Furthermore, due to the short duration of the fault, it is impossible to pinpoint the fault location since there is not enough time to activate the overcurrent protection device.

In order to overcome the aforementioned challenges, a method for controlling the current limit level is proposed. The proposed method enables the inverter to source an additional current under a perceived fault condition, for a pre-determined period of time, required by the primary protection device to sense and clear the fault. The current limit level of the inverter under fault conditions can be allowed between certain current levels that are beyond the rated output current of the inverter. The current limit level can be controlled by a controller implemented through a combination of software and hardware.

In an example, the controller may detect whether a fault has occurred in the electrical circuit connected to the inverter. In particular, the controller may be connected to the electrical circuit through a set of sensors such as a current sensor. In response to the detection of a fault in the electrical circuit, the controller may generate a first signal to set the current limit level of the inverter to a first predefined level for a first predefined period. The controller may also generate a second signal to set the current limit level of the inverter to a second predefined level for a second predefined period, where the second predefined level is less than the first predefined level. The current limit level indicates the maximum amount of current supplied by the inverter under fault conditions. Upon generation of the first and second signals, the first and second signals may be transmitted to the inverter. The transmission of the first and second signals may be performed over a communication network through a wired or wireless connection. Some non-limiting examples of wired networks may include Ethernet, a Local Area Network (LAN), a fiber-optic network, and the like. Some non-limiting examples of wireless networks may include Wireless LAN (WLAN), cellular networks, Bluetooth or ZigBee networks, and the like.

As a result, the inverter may supply a first level current for a short pre-determined period of time e.g., half to one cycle, followed by a second current level for time 'T2'. This periodic cycling continues until a point is reached where either the primary protection device senses enough current to clear the fault or the inverter trips after a predefined number 'n' of attempts. If the fault is cleared or the event was a momentary overload/inrush, inverter currents return to their pre-fault wave shape.

The controller keeps count of the number of consecutive instances when the first current level is attained consecutively. If the count reaches a pre-set 'n', the controller may transmit a trip signal to the inverter e.g. inverter controller to trip the inverter from the electrical circuit prior to the n+1th attempt. If the inverter current does not reach the first current level after a time delay of T2, the count resets to avoid nuisance trips. The modification to the inverter switching technique to provide an increased current results in the current waveform resembling a square wave.

Controlling the current limit level can facilitate accomplishing various functionalities. In one aspect, temporarily increasing the current limit level for a short circuit fault helps protection equipment to reliably detect a fault. In another aspect, when a short circuit is about to occur during the maintenance period, decreasing the current limit level of current supplied by the inverter and/or reducing the inverter trip limit improves the safety of a service personnel.

Thus, the proposed solutions provide a unique approach of having a dynamic limit of the current limit level at which the inverter supplies current in case of a short circuit fault. In addition, dynamic limiting of the current limit level is higher for short time periods, which enables the inverter to operate even in higher inrush events.

Various embodiments of the present disclosure offer multiple advantages. For instance, the present disclosure uses software-controlled current limits of the inverter to distinguish between fault and inrush current which could be used to clear the faults quickly while keeping the ride-through feature for inrush current loads in inverter-based distribution networks. This solution, in addition to increasing the resiliency and reliability of a microgrid, also provides an ability to ride through potential blackout and brownout conditions. The present disclosure also includes the novel feature of reducing incident energy with the ERMS function which offers a safer working electrical architecture for service personnel.

Various example embodiments of the present disclosure are described hereinafter with reference to FIGS. 1-13.

Figure 1B:
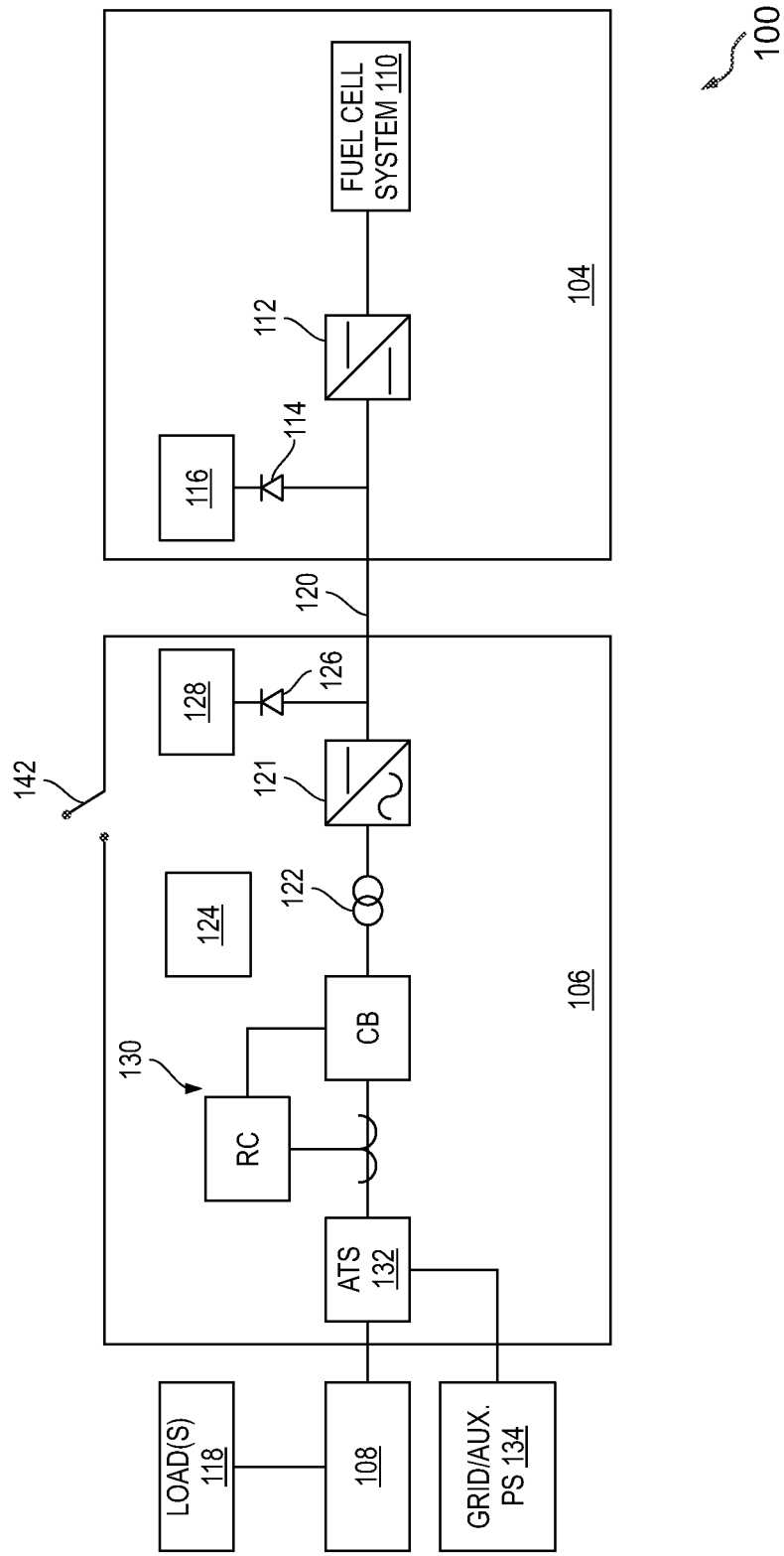
FIG. 1B is a schematic illustrating the environment depicting an electrical architecture of a power module and an inverter module of the microgrid power system of FIG. 1A.

FIG. 1A is a schematic illustrating an environment 100 related to at least some example embodiments of the present disclosure. The environment 100 illustrates an electrical architecture of a microgrid power system 102, according to various embodiments of the present disclosure. FIG. 1B is a schematic illustrating the environment 100 depicting an electrical architecture of a power module 104 and an inverter module 106 of the microgrid power system 102 of FIG. 1A. Although the environment 100 is presented in one arrangement, other embodiments may include the parts of the environment 100 (or other parts) arranged differently depending on, for example, the microgrid power system 102 proposed in the present disclosure for controlling a fault current level in a microgrid. It may be noted that a fault can occur anywhere in the grid and/or the microgrid such as at an electrical source, a load, a transmission line, and the like.

As may be understood, the microgrid power system 102 includes the power module 104, the inverter module 106, and a power distribution system (PDS) 108. In an embodiment, the power module 104 may include a distributed energy resource (DER), such as a fuel cell system (e.g., a system containing one or more fuel cell stacks or columns) 110. However, in some embodiments, other suitable DERs may be utilized such as, but not limited to, wind turbines, solar photovoltaics, micro turbines, etc. Further, in some embodiments, the fuel cell system 110 may utilize solid oxide fuel cells (SOFCs) having a ceramic oxide electrolyte located between anode and cathode electrodes. The SOFCs may be separated by conductive interconnect plates in the SOFC stack. Other fuel cell types, such as proton exchange membrane (PEM), molten carbonate, phosphoric acid, etc., may be used.

Further, the power module 104 may also include a Direct Current (DC/DC) converter 112, a diode 114, and an internal load 116. The DC/DC converter 112 may be configured to convert the voltage power output from the fuel cell system 110 to a voltage suitable for the internal load 116 and/or for one or more microgrid loads e.g., external loads 118A, 118B, and 118C (hereinafter, collectively referred to as 'microgrid loads 118' or 'external loads 118'). The internal load 116 may include balance-of-plant components, such as blower (s), valves, etc., of the power module 104. The diode 114 may be configured to control current flow to the internal load 116. The power module 104 may be connected to the input of the inverter module 106 by an electrical bus 120. The microgrid load 118 is electrically connected to the output of the inverter module 106.

The inverter module 106 may include an inverter 121 and one or more additional optional components, such as a transformer 122, a controller 124, a diode 126, an internal electrical load 128, an OCPD (e.g., a protective relay) 130, and/or an automatic transfer switch (ATS) 132. The inverter 121 may be a bidirectional inverter, in some embodiments. The internal electrical load 128 (if present) may include balance-of-plant components of the inverter module 106. The diode 126 may be configured to control current flow to the internal electrical load 128.

The inverter module 106 may be electrically connected to the one or more microgrid loads 118 by the PDS 108. In one embodiment, the OCPD 130 may include a protective relay including a relay coil (RC) and a circuit breaker (CB) configured to electrically disconnect the inverter module 106 from the PDS 108. The OCPD 130 may be configured to receive information about the EDS (voltage, current, and frequency) of power flowing through the bus 120 to the PDS 108. The OCPD 130 may include a current and a voltage transformer (e.g., the relay coil) configured to transform measured voltage and current values to a more appropriate power level to be utilized by the OCPD 130. Based on this information, the OCPD 130 reacts to any abnormal conditions detected, for example, by tripping the circuit breaker (CB) to disconnect the inverter module 106 from the microgrid loads 118, if necessary. Each OCPD is set or programmed for the desired tripping time (i.e., time delay for relay coordination and system reliability purposes). The decision to trip open or close the circuit breaker of the OCPD 130 may be made by the relay logic algorithms that may be programmed into the controller 124. Alternatively, the OCPD 130 may include a fuse or another suitable OCPD device type.

The controller 124 may be configured to control the operations of the inverter module 106 and/or the power module 104, as discussed in detail below, with respect to FIGS. 5-8. The controller 124 may be disposed in, or operatively connected to, the inverter module 106 or the power module 104. The controller 124 may include a central processing unit and/or a memory configured to store operating software. In some embodiments, the controller 124 may provide an interface to allow an operator to control the system 102. The controller 124 may be a dedicated inverter module 106 controller or a general system controller.

The controller 124 may be implemented using computing devices (such as computers) comprising processors, memory, and other components that have been programmed with instructions to perform specific functions or may be implemented in processors designed to perform the specified functions. A processor may be any programmable microprocessor, microcomputer, or multiple processor chips or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions. The processor may include a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The optional ATS 132 may be configured to selectively electrically connect the inverter module 106 to the PDS 108 or to an auxiliary power source 134, such as a power storage device (e.g., battery or supercapacitor bank), auxiliary generator (e.g., diesel generator), and/or utility grid. For example, the auxiliary power source 134 may be used to provide power to the system 102 during startup of the power module 104. In addition, when the power generation of the power module 104 exceeds the power requirements of the microgrid loads 118, the excess power may be provided to the auxiliary power source 134 for use and/or storage. In some embodiments, the ATS 132 may operate as a circuit breaker, and the OCPD 130 may be omitted.

In one embodiment, as shown in FIG. 1A, the PDS 108 may include a primary breaker 136 and OCPDs 138 (e.g., 138A, 138B, and 138C) that are electrically connected in parallel between the respective microgrid loads 118 (e.g., 118A, 118B, and 118C) and the inverter module 106 by parallel branches (e.g., 140A, 140B, and 140C) of a distribution bus 140. The primary breaker 136 may be located on the common portion of the distribution bus 140 between the OCPDs 138A-138B and the inverter module 106. The OCPDs 138 may be configured to receive information about the EDS power (e.g., voltage, current, and/or frequency) flowing through the distribution bus 140 to a corresponding load 118 electrically connected thereto. In an embodiment, FIG. 1B also shows a switch 142 that may be used by a technician for turning ON and OFF the inverter module 106.

As may be understood, one of the objectives of the invention is to enhance the feature set of the inverter module. However, in some embodiments, it could also be implemented in a DC/DC Converter as well to provide the same benefit. In DC distribution systems, increasing available fault current carries similar advantages of clearing faults faster by opening protective devices such as fuses and breakers faster and more reliably. The same concept could be applied in the processor controlling a DC/DC converter to allow it to have a limited duration increased short circuit capability.

Additionally, in the case of maintenance or temporary equipment lineups where reducing the available fault current is advantageous, this concept could also be used to provide an ERMS Mode to the DC/DC converters in the system, or in any generic DC distribution application. This mode would reduce the total fault current available, or shorten the time that current is available, to reduce the available energy that the product contributes to a faulted condition.

As in the inverter case, the concept would be realized with a hardware change to the current limiter which already exists to make the setpoint dynamically controllable by the processor, and then the processor code would control the behavior of the new feature.

Figure 2:
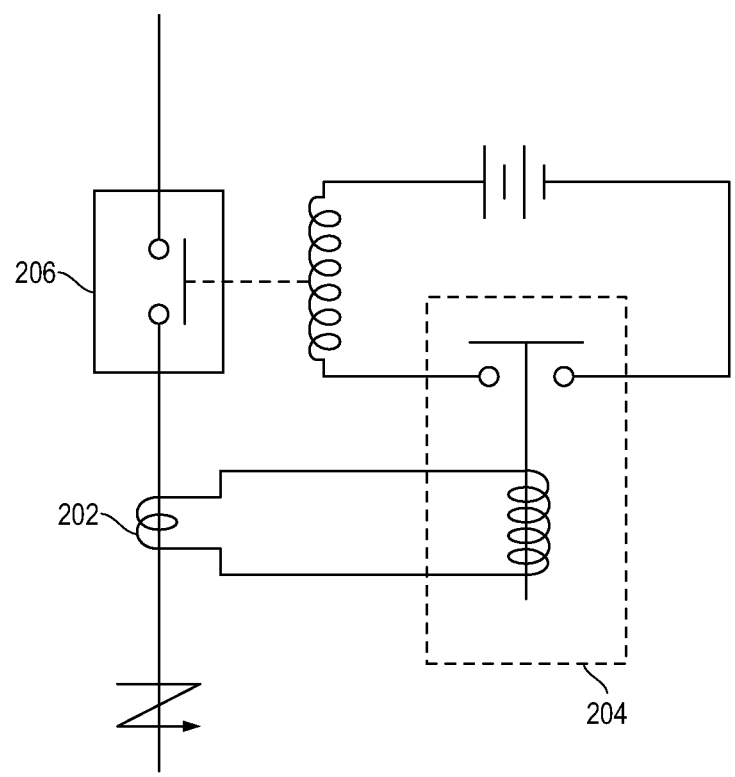
FIG. 2 is a schematic of an Overcurrent Protection Device (OCPD) of the microgrid power system of FIG. 1B.

FIG. 2 is a schematic of an Overcurrent Protection Device (OCPD) 200 of the microgrid power system 102 of FIG. 1A. In an example embodiment, the OCPD 200 is substantially similar to any of the OCPDs 138 of FIG. 1A. The OCPDs 200 may include protective relays which may include a current transformer 202 and a voltage transformer 204 configured to transform measured voltage and current values to a more appropriate power level to be utilized by the OCPD 200. Based on this information, the OCPD 200 may be configured to react to any abnormal conditions detected, for example, by tripping a circuit breaker 206 using a trip coil to disconnect the corresponding load 118, if necessary. Each OCPD 200 may be set or programmed for the desired tripping time (i.e., time delay for relay coordination and system reliability purposes, such as 2 to 10 seconds, for example, 4 to 6 seconds). The decision to trip open or close the circuit breaker 206 is made by the relay logic algorithms stored in the controller storage.

The OCPD 130 shown in FIG. 1B may include similar components and/or features as the OCPD 200 shown in FIG. 2. In some embodiments, other examples of the OCPDs 130 and/or OCPDs 138 may include fuses, that can be used in place of or in combination with the protective relays. If fuses are used, then they require a certain minimum current passing through them to open (e.g., to melt the fusible link) and disconnect the faulty element (e.g., one of the loads 118) from the inverter module 106.

According to various embodiments, the controller 124 may be programmed with a control algorithm that makes the inverter module 106 source an additional current under a perceived fault condition, for a pre-determined period of time, such as a time period needed for the OCPDs 200 to sense and clear a fault. In particular, the controller 124 may be configured to output one or more (e.g., two) trip current levels that are beyond the rated current level of the inverter module 106 (e.g., of the inverter 121) in response to a perceived fault condition (e.g., a lower resistance on the electrical circuit). The trip current is used to attempt to trip the circuit breaker or fuse on the portion of the electrical circuit containing the fault before the inverter 121 overheats and has to shut off.

For example, if the fault (e.g., short circuit) is associated with the first load 118A shown in FIG. 1A, then the inverter 121 sends the trip current to the first branch 140A of the distribution bus 140 that is connected to the faulty load 118A to attempt to trip (i.e., open) the OCPD 138A located on the first branch 140A to isolate the load 118A from the inverter 121. As used herein, the fault is associated with the first load 118A if the fault occurs in the first load 118A, in the first branch 140A of the distribution bus 140 which is electrically connected to the first load 118A and/or in any component of the circuit electrically connected to the first branch 140A. Thus, if the fault is a short circuit associated with the first load 118A, then the branch 140A will experience a lower resistance than branches 140B and 140C. This will cause the trip current to preferentially flow to the OCPD 138A located on the branch 140A. If the trip current trips the OCPD 138A, then the inverter 121 may continue to provide the predetermined output current to the non-faulty loads 118B and 118C via respective branches 140B and 140C and OCPDs 138B and 138C without having to shut down due to overheating caused by the fault on load 118A.

Figure 3:
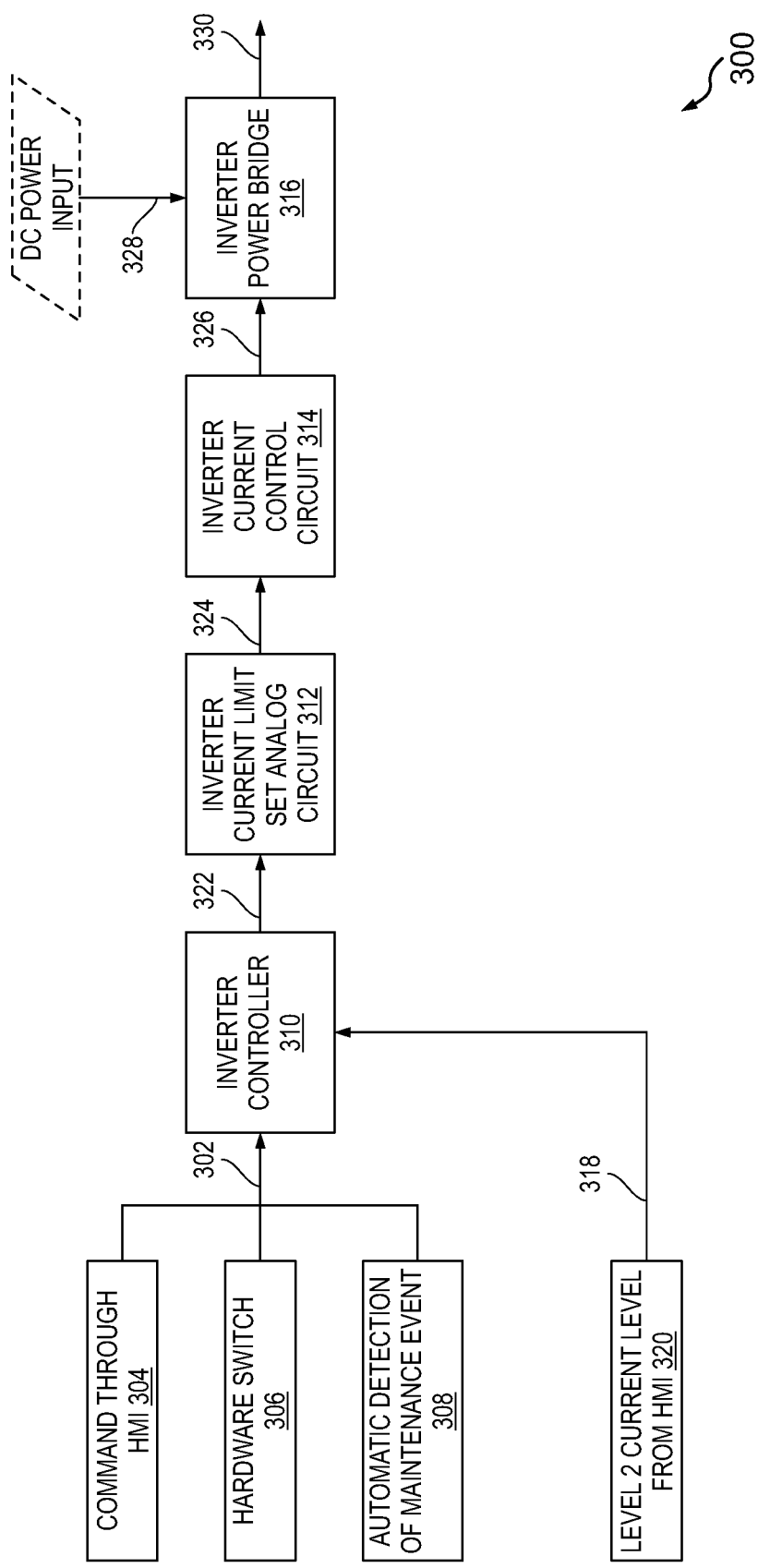
FIG. 3 illustrates a block diagram of a current limit change implementation, according to various embodiments of the present disclosure.

FIG. 3 illustrates a block diagram 300 of a current limit change implementation, according to various embodiments of the present disclosure. Referring to FIG. 3, it may be understood that an ERMS command 302 is a digital signal (either ON or OFF) that comes from one of the three different ways shown in FIG. 3 (i.e., a command through remote or local Human Machine Interface (HMI) 304, a hardware switch 306, or automatic detection of maintenance event 308 such as a door open switch).

In an embodiment, the current limit change implementation may be implemented by a combined operation of one or more components such as an inverter controller 310, an inverter current limit set analog circuit 312, an inverter current control circuit 314, and an inverter power bridge 316. In an embodiment, the inverter controller 310 also optionally receives a level 2 command 318 which is a level 2 current level from the HMI (see, 320).

When the inverter controller 310 receives the command 302, the inverter 121 changes the short circuit current limit to a lower value i.e., level A (as shown in FIG. 10B) from an existing current limit level e.g. a level C (as shown in FIG. 10A). Herein, the existing current limit level e.g. level C corresponds to a short circuit current limit when the ERMS is not enabled. Further, level A is lower in comparison to level C, as the current level is required to be a lower value during maintenance for safety purposes. If a short circuit occurs when ERMS is enabled, then the inverter 121 constantly produces current level A until the inverter 121 or some other protection device trips. The inverter trip also reduces from a default value (i.e., when the ERMS is disabled) to a lower value (i.e., when the ERMS is enabled). This lower level (level A) of current and reduced trip times in turn reduces the available incident energy to a short circuit to a level that is safe enough for maintenance personnel to perform the work. Thus, it may be understood that the level 2 current 318 received by the inverter controller 310 may correspond to the level A which is an RMS value.

Further, the inverter controller 310 generates Pulse width modulation (PWM) pulses 322 to the current limit circuit 312. Then, the current limit circuit 312 generates a current limit analog voltage 324. Further, the inverter current control circuit 314 generates a signal (see, 326) based on the PWM pulses 322 and the current limit analog voltage 324 for driving gate drive circuits of the inverter power bridge 316. Moreover, a main DC power input 328 may be received by the inverter power bridge 316 and supplied to an inverter power train. Finally, a current output 330 to a short circuit may be generated and transmitted.

Figure 4:
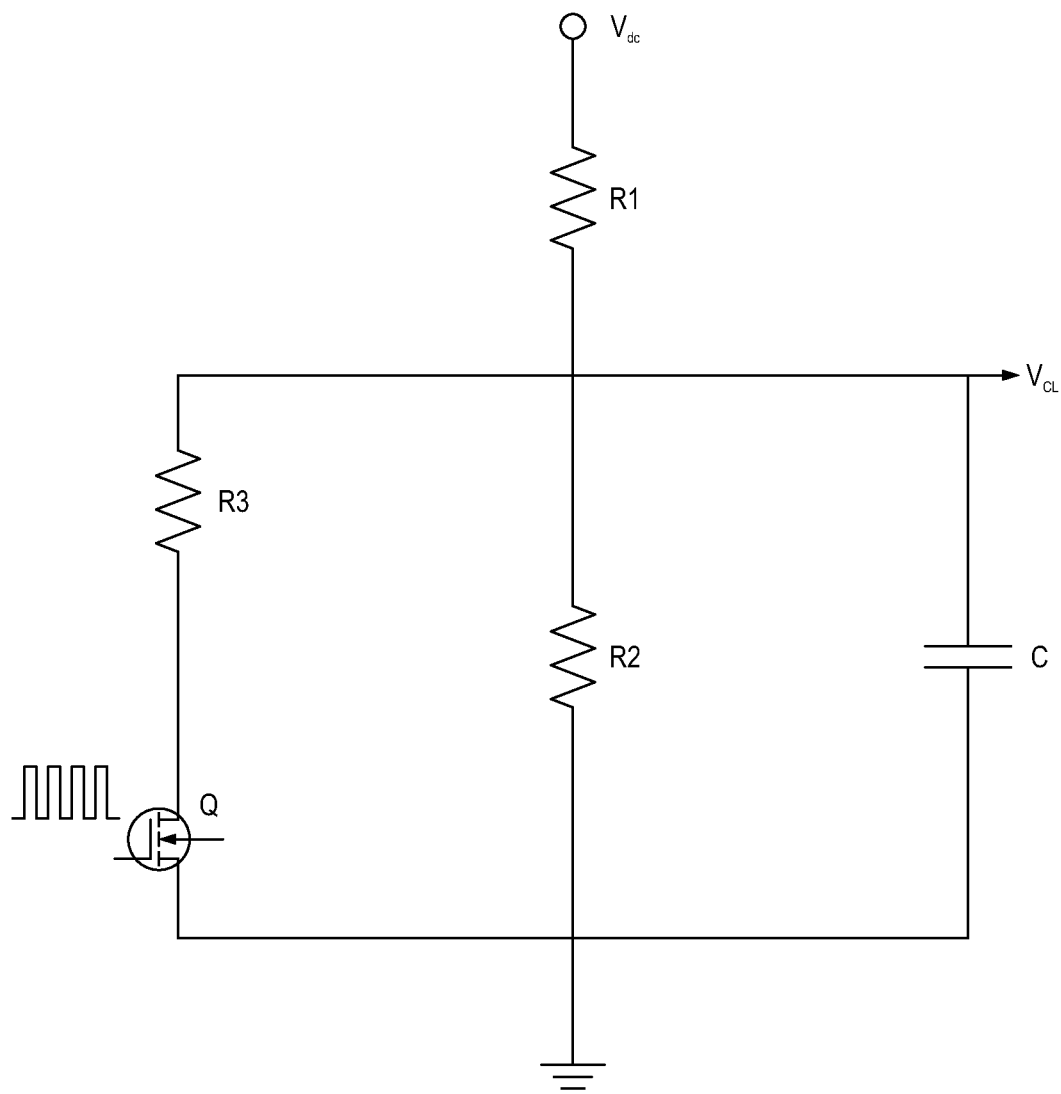
FIG. 4 illustrates a circuit that facilitates the change of current limits of an inverter module, according to various embodiments of the present disclosure.

FIG. 4 illustrates a circuit 400 that facilitates the change of current limits of an inverter module, according to various embodiments of the present disclosure. In an embodiment, the change in current limit level ($V_{CL}$) is controlled through the duty cycle of PWM pulses that drive the transistor Q as shown in FIG. 4. In an example implementation, the following equations may be used to calculate the current limit level ($V_{CL}$), a minimum value for the current limit level ($V_{CL_{min}}$) and a maximum value for the current limit level ($V_{CL_{max}}$):

$$V_{CL_{max}} = V_{dc} \times \frac{R2}{R1 + R2} \quad \text{Eqn. 1}$$

$$V_{CL_{min}} = V_{dc} \times \frac{(R2R3/R2 + R3)}{R1 + (R2R3/R2 + R3)} \quad \text{Eqn. 2}$$

$$V_{CL} = V_{CL_{min}} \times D + V_{CL_{max}} \times (1-D) \quad \text{Eqn. 3}$$

Where, $$D(\text{duty cycle of transistor } Q) = \frac{Q \text{ on time}}{Q \text{ on time} + Q \text{ off time}} \quad \text{Eqn. 4}$$

From the equations, it may be clear that, when the duty cycle is zero i.e., the transistor Q is open for 100% of the time the $V_{CL}$ (voltage that represents the current limit) is at its maximum value i.e., the inverter supplies a higher amount of short circuit current. Further, when the duty cycle is 100% i.e., the transistor Q is in closed position 100% of the time, the voltage $V_{CL}$ is at its minimum value.

Furthermore, based on the duty cycle ratio i.e., between 0-100%, the $V_{CL}$ can vary between $V_{CL_{max}}$ and $V_{CL_{min}}$ as shown in the above equations. It may be noted that the current waveforms have a format corresponding to RMS levels.

Figure 5:
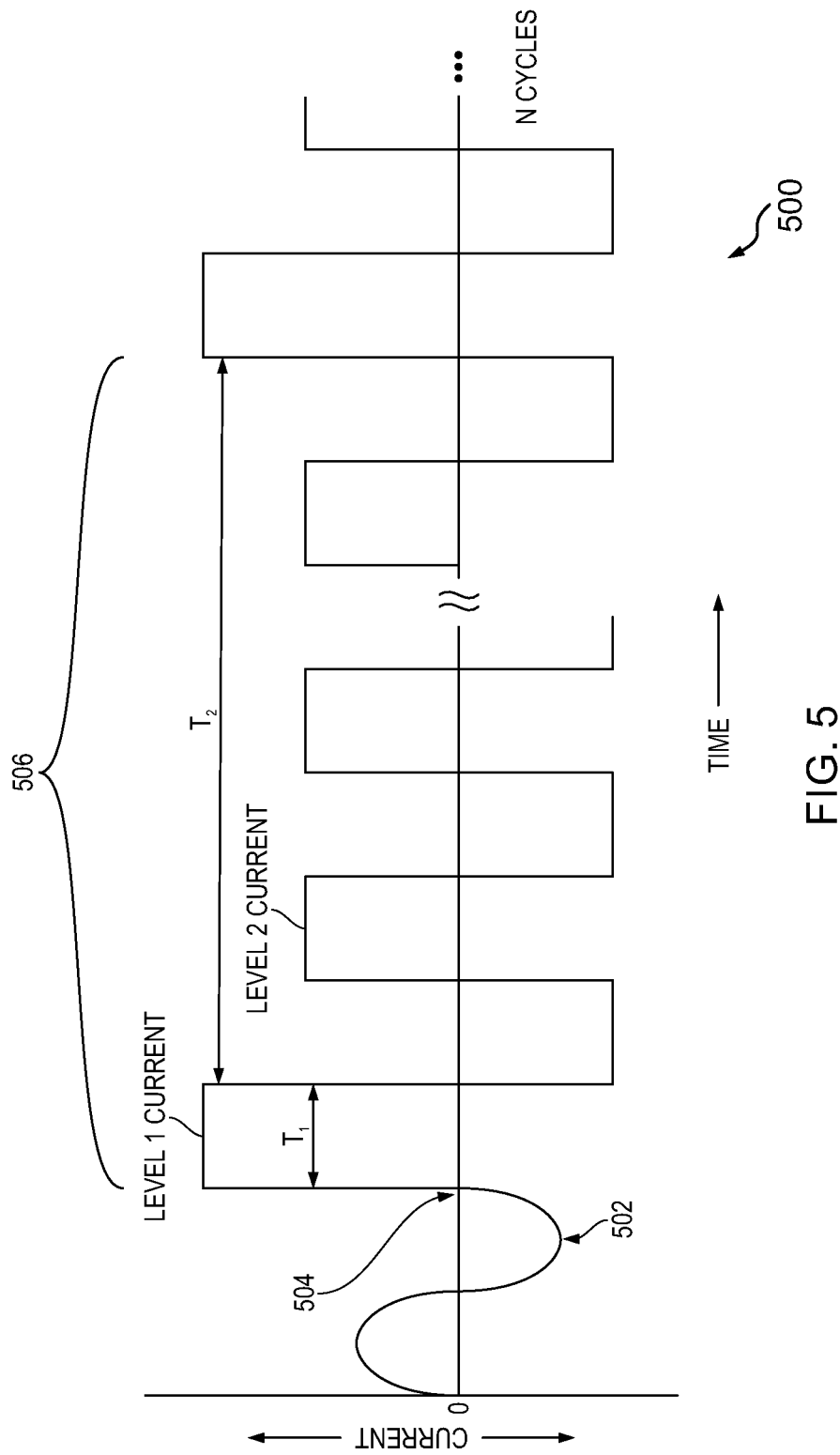
FIG. 5 is a current waveform diagram showing inverter module current levels, according to various embodiments of the present disclosure.

FIG. 5 is a current waveform diagram 500 showing inverter module current levels, according to various embodiments of the present disclosure. Referring to FIGS. 1A, 1B, and 5, the inverter module 106, under the control of the controller 124, may output normal current waveform (see, 502) having a current level that is below a normal rated current level of the inverter module 106, unless a fault condition, such as a short circuit or a current inrush, occurs. When a short circuit occurs (see, 504), the resistance of the load (e.g., load 118A) attached to the inverter module 106 may drop to near zero. As such, the current output by the inverter module 106 may increase until the output of the inverter module 106 reaches a level 1 current, and further current increase is prevented by the inverter module 106 (e.g., to prevent overheating). When a current inrush occurs, a similar effect on the current output of the inverter module 106 may be produced.

When the inverter module 106 detects a fault condition, such as a level 1 current, the inverter module 106 may be configured to enter a fault mode, where a limited amount of trip current is output from the inverter module 106 for a set recovery period or less, in order to provide a power and/or time for the fault to be cleared (i.e., to trip the OCPD 138A located on the branch 140A of the distribution bus 140 electrically connected to the location of the fault). In particular, during the fault mode, the current output by the inverter module 106 may be limited, such that the inverter module 106 outputs a fault waveform (see, 506) that resembles a square wave waveform, for one or more fault waveform cycles, without overheating. For example, during one fault mode waveform cycle, the inverter module 106 may be configured to limit current output to a level 1 current, for a time period of T1, and then limit current output to a level 2 current, for a time period of T2. The inverter module 106 may then repeat the fault waveform 506 for a fault period corresponding to "N" number of current cycles, or until the fault condition is cleared (if the fault condition is cleared before the fault period expires). The fault condition is cleared if the fault is resolved (e.g., the inrush current terminates) or if the OCPD (e.g., 138A) is tripped into the open state to electrically disconnect the fault from the rest of the circuit.

According to various embodiments, both the level 1 and level 2 currents may optionally exceed the current level of the normal AC waveform and the normal rated operating current of the inverter module 106. The magnitude of the level 1 current may exceed the magnitude of the level 2 current. For example, the level 1 current may exceed the level 2 current by an amount ranging from about 20% to about 30%, such as about 25%.

The time period T1, during which the level 1 current may be supplied, may range from one-half of a current cycle to several current cycles (e.g., from 1/120 to 1/60 of a second). The time period T2, during which the level 2 current may be supplied, may range from one-half to multiple current cycles. The inverter module 106 may be configured to repeatedly output the fault mode waveform (i.e., the trip current), in order to allow the OCPD 138A on the fault containing branch 140A to receive enough current to sense and/or clear a fault connected thereto (i.e., for the trip current to trip the OCPD 138A into the open state). For example, the inverter module 106 may be configured to output the fault waveform 506 for a recovery period ranging from about 1 second to 5 seconds, such as from about 1 second to about 4 seconds (i.e., from about 60 current cycles to about 132 current cycles), unless the fault condition is cleared before the recovery period expires. If the recovery period expires without the fault condition being cleared, the inverter module 106 may be configured to trip (i.e., shut off) and stop providing power to all of the loads 118 (e.g., 118A, 118B, and 118C).

If the fault is cleared during the recovery period, then the inverter module 106 may be configured to return to normal operation and output the normal AC waveform to the remaining loads 118A, 118B, and 118C which are electrically connected to the inverter module 106. For example, the inverter module 106 may resume normal operation, if a fault is cleared by tripping the OCPD 138A or if a momentary current overload/inrush has dissipated.

The controller 124 may be configured to measure the recovery period by counting the number of times that current level 2 is reached consecutively, thereby determining the number of times the fault waveform 506 has been repeated. If the count reaches a pre-set number 'N' of current cycles, which corresponds to a set number of fault waveform cycles, then the inverter module 106 may be configured to trip (i.e., shut off) prior to the n+1$^{th}$ current cycle. If the inverter current does not reach level 2 after a time T2, the count resets to avoid nuisance trips.

Figure 6:
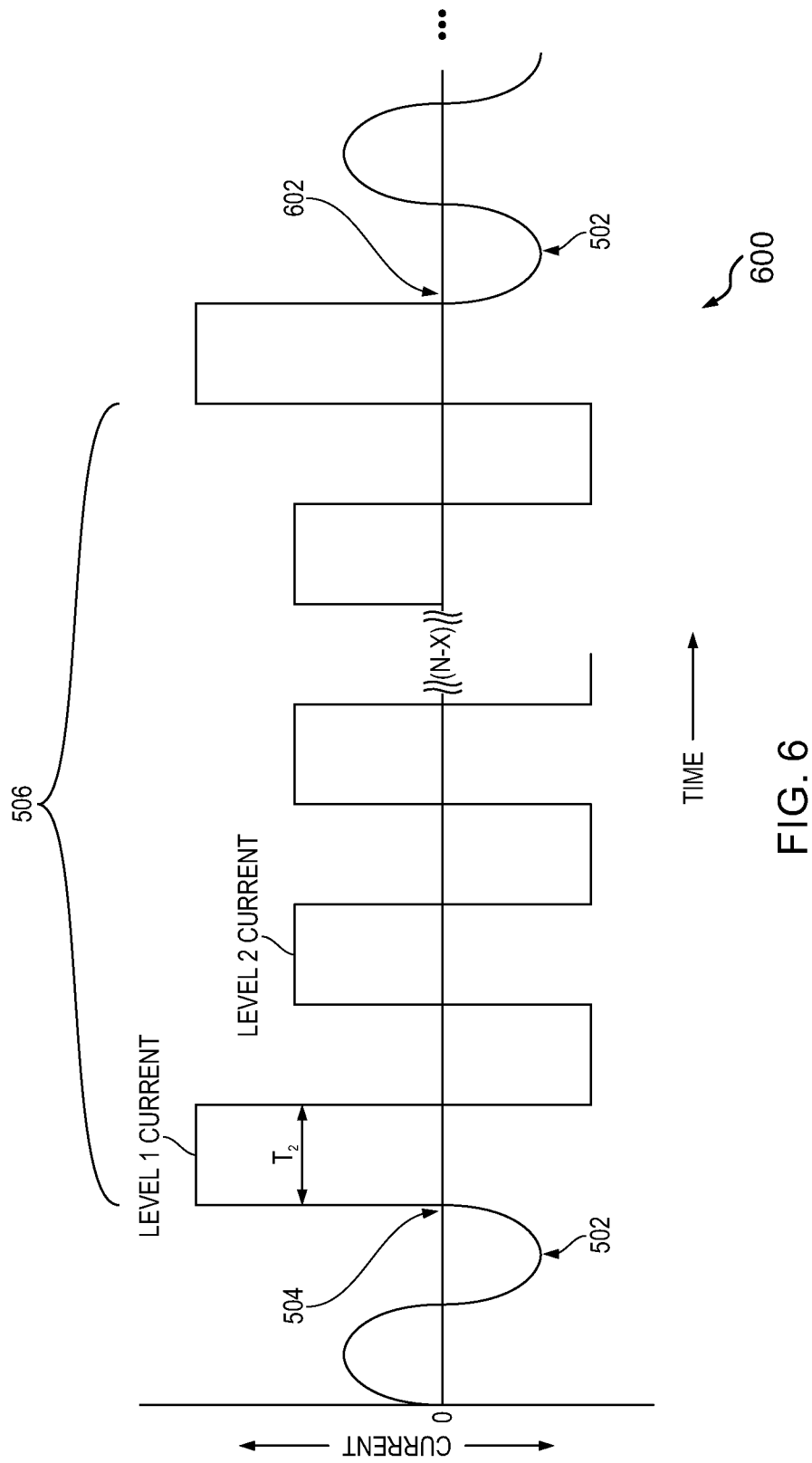
FIG. 6 is a current waveform diagram showing inverter module current levels when a fault condition occurs and is cleared by opening an OCPD, according to various embodiments of the present disclosure.

FIG. 6 is a current waveform diagram 600 showing inverter module current levels when a fault condition occurs and is cleared by opening an OCPD (e.g., the OCPD 130), according to various embodiments of the present disclosure. It may be noted that, FIGS. 1A, 1B, and 6 illustrate scenarios where the inverter module 106 is able to source sufficient trip current for the OCPD 138A on the fault containing branch 140A, to detect the trip current and clear the fault (see, 602), within a set number of current cycles corresponding to the recovery period and/or a number the fault waveform cycles. The inverter module 106 resumes normal operations and outputs the normal AC waveform to supply power to the loads 118 (e.g., 118A and 118B) that remain electrically connected to the PDS 108.

Figure 7:
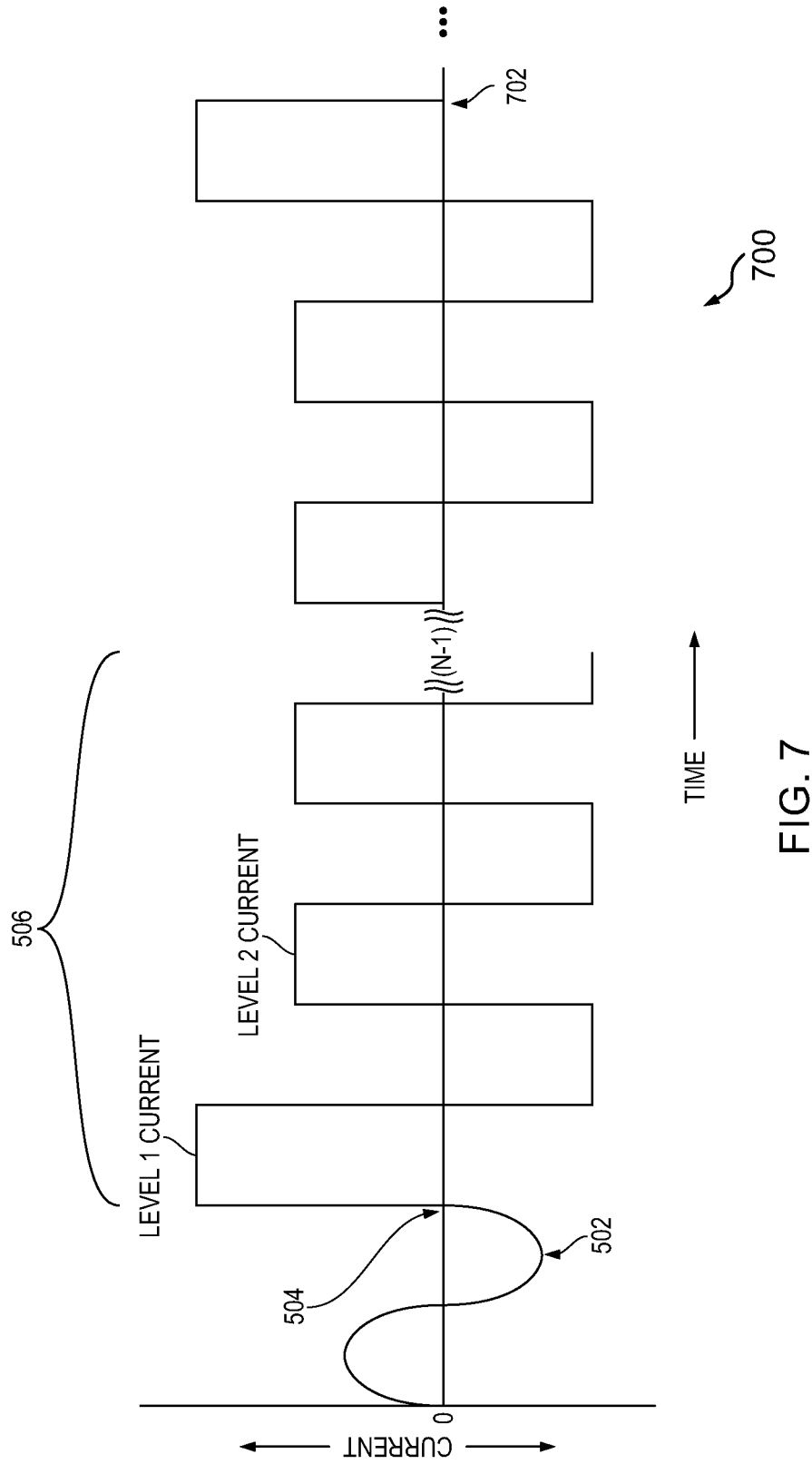
FIG. 7 is a current waveform diagram showing inverter module current levels when a fault condition occurs and is not cleared, according to various embodiments of the present disclosure.

FIG. 7 is a current waveform diagram 700 showing inverter module current levels when a fault condition occurs and is not cleared, according to various embodiments of the present disclosure. Referring to FIGS. 1A, 1B, and 7 indicate cases where the inverter module 106 is unable to source sufficient trip current to operate the OCPD 138A, the inverter module 106 trips (i.e., shuts off) (see, 702) to safeguard itself from overheating and damage, after 'N' current cycles corresponding to the fault waveform 506 being repeated a set number of times. Accordingly, the PDS 108 is given time to clear the fault, rather than have the inverter module 106 trip at the moment a fault condition is sensed.

Figure 8:
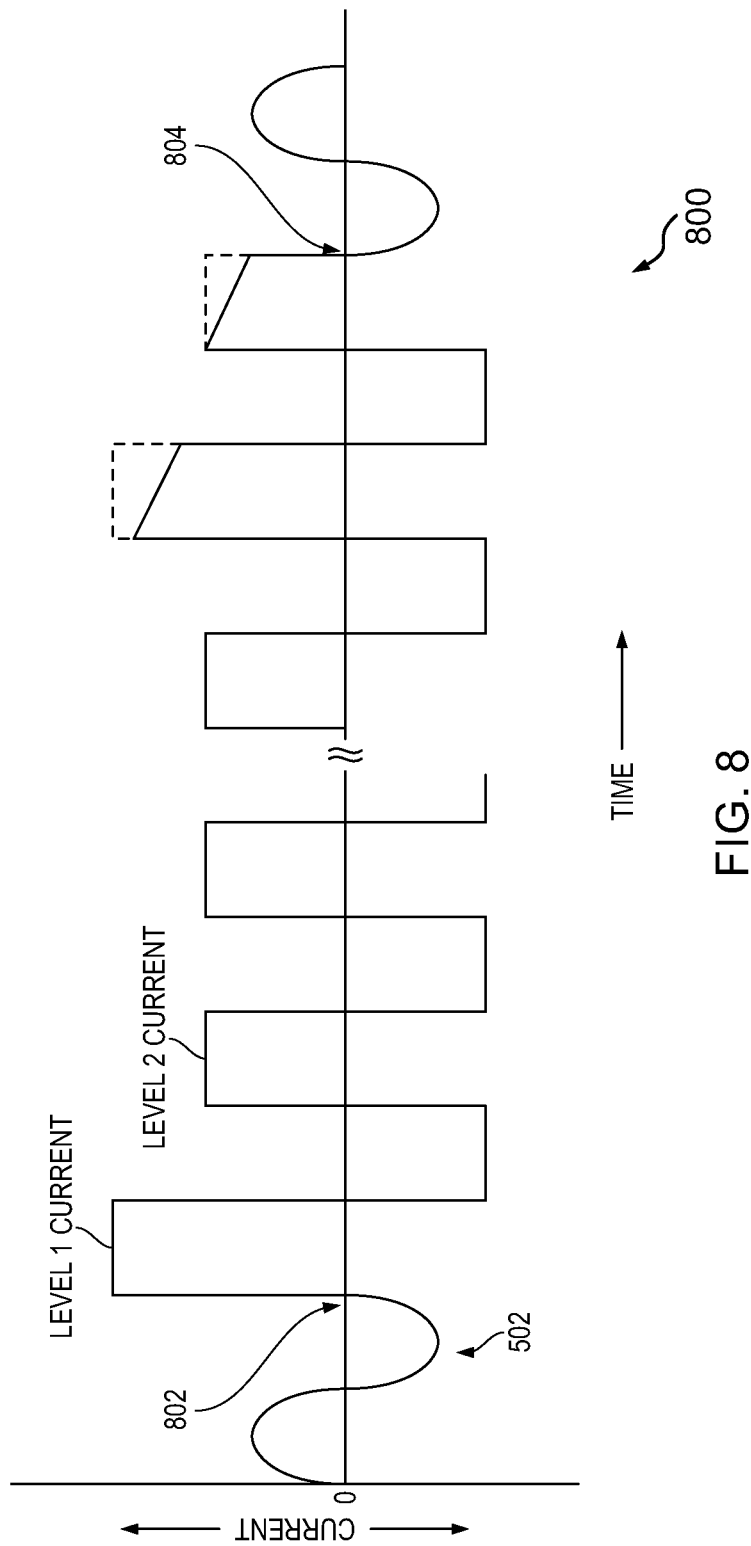
FIG. 8 is a current waveform diagram showing inverter module current levels during a temporary overload or inrush which automatically reduces itself before the inverter trips and without opening the OCPD, according to various embodiments of the present disclosure.

FIG. 8 is a current waveform diagram 800 showing inverter module current levels during a temporary overload or inrush (see, 802) which automatically reduced itself before the inverter trips and without opening the over current protection device, according to various embodiments of the present disclosure. Referring to FIGS. 1A, 1B, and 8 indicate cases where the inverter module 106 is unable to source sufficient trip current to operate the OCPD 138A, the inverter module 106 trips (i.e., shuts off) to a normal current value (see, 804) to safeguard itself from overheating and damage, after 'N' current cycles corresponding to the fault waveform 506 being repeated a set number of times. Accordingly, the PDS 108 is given time to clear the fault, rather than having the inverter module 106 trip at the moment a fault condition is sensed.

Figure 9:
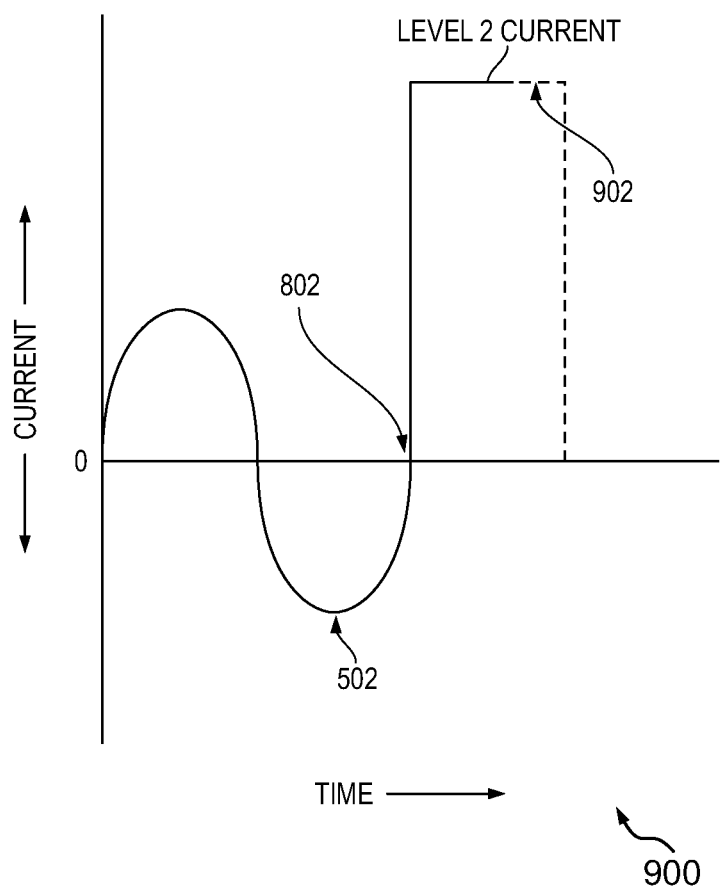
FIG. 9 is a current waveform diagram showing inverter module current levels during an energy reduction maintenance setting (ERMS) mode, according to various embodiments of the present disclosure.

FIG. 9 is a current waveform diagram 900 showing inverter module current levels during an energy reduction maintenance setting (ERMS) mode, according to various embodiments of the present disclosure. Referring to FIGS. 1A, 1B, and 9, when there is a need to service the system 102, the inverter module 106 may be set to the ERMS mode. For example, the ERMS mode may be activated by a service technician using a switch (e.g., toggle, pushbutton, etc. switch) 142 on the inverter module 106. After servicing, the service technician may deactivate the ERMS mode using the switch 142.

In the alternative, the ERMS mode may be activated and deactivated by communication with the controller 124 and/or controller software. For example, a service technician may utilize a wired or wireless connection to send an ERMS signal to the controller 124, in order to activate and deactivate the ERMS mode. In another embodiment, the controller 124 may be configured to automatically activate and/or deactivate the ERMS mode, in response to an associated condition or signal, such as a service technician accessing the inverter module 106 or the PDS 108. For example, the controller 124 may continuously monitor detection switches, such as switch 142, connected to access points, such as access doors or panels of the inverter module 106 and/or PDS 108. The controller 124 may activate the ERMS mode if the switch 142 generates a signal indicating that an inverter module access door or panel is open and may deactivate the ERMS mode when the switch 142 generates a signal indicating that the door or panel is closed. In some embodiments, the inverter module 106 may include multiple detection switches placed at locations where the ERMS function is needed if such locations are accessed.

Upon activation of the ERMS mode, the controller 124 may be configured to signal the OCPDs 130 and/or 138 to operate in the ERMS mode where the OCPDs 130 and/or 138 are configured to trip at a lower fault current than during normal operation, in order to reduce the incident energy in the event of a potential arc flash. Although a circuit breaker is more sensitive to fault current in the ERMS mode, a kilo ampere magnitude current may be needed for the circuit breaker to operate. Since the inverter module 106 may not be able to source this level of short circuit current to a fault, in order to operate the circuit breaker, when the inverter module 106 is operating in the ERMS mode, the inverter module 106 may be configured to control the OCPDs 130 and/or 138 to trip within half a cycle of detecting a level 2 current (see, 902), so as to prevent injury to a service technician and/or damage to system components.

FIG. 10A illustrates a Root Mean Square (RMS) current plot 1000 showing inverter module current limit levels and trip time during a short circuit condition when the ERMS mode is not enabled, according to various embodiments of the present disclosure. FIG. 10B illustrates a current waveform diagram 1010 showing inverter module current levels and trip time during a short circuit condition when the ERMS mode is enabled, according to various embodiments of the present disclosure. Referring to FIGS. 10A and 10B, it may be understood that the inverter level is supposed to rise to level C for a short period of time when the fault occurs (see, 1002). As may be understood, it is not possible to continuously supply level C current as the inverter power train is designed only for a level between level B and level C current level. However, it is acceptable to increase to level C for a short period of time as design allows. The inverter raises its short circuit current limit to limit C for a short period of time to help the protection relay reliably detect a fault.

Further, during the event of maintenance, the danger of arc flash is directly proportional to available incident energy in the cabinet. The incident energy available depends upon the amount of possible current supplied by the inverter and the duration for which this high current is available. It is known that currents supplied by an inverter during a short circuit are much higher than rated currents. While it is essential for the inverter to supply a high current to clear the faults quickly, it is not the same case when a person is working during maintenance. The idea here is to reduce the level of current supplied by the inverter (current limit command) and the duration for which the inverter can supply that current (trip time) to a safe level during a maintenance event. This reduced level is referred to as level C in the present disclosure. In summary, it may be noted that Current level A<Current level B<Current level C.

Further, the level C current level is either a hardcoded value in the inverter controller or it can be set from local or remote HMI. This is an analog DC value. When ERMS is not engaged then the inverter controller 310 changes the current limit level between level B and level C at fixed intervals. For example, level C current level for 'x' milliseconds and level B current level for 'y' milliseconds. The relationship between levels B, C, and time 'x' and 'y' are dependent on the capacity of inverter hardware and its thermal limits as illustrated in FIG. 10A. Herein, in case when the ERMS is not enabled, the levels B and C are passed by the inverter until the inverter trips (see, 1004). Further, the level A is passed by the inverter when the ERMS is enabled, for an inverter trip time that is less than a condition when the ERMS is not enabled. After completion of this trip time, is when the inverter trips (see, 1012).

As explained above, levels B, C, and times x, y, and total trip times are preprogrammed in the inverter software during the design phase based on the capability of the hardware. The inverter controller changes the duty cycle of transistor Q on command to change the levels at required intervals. Moreover, in an embodiment, the levels of currents may be any number, however, considering two levels is the simplest form of implementation, without limiting the scope of the invention.

Figure 11:
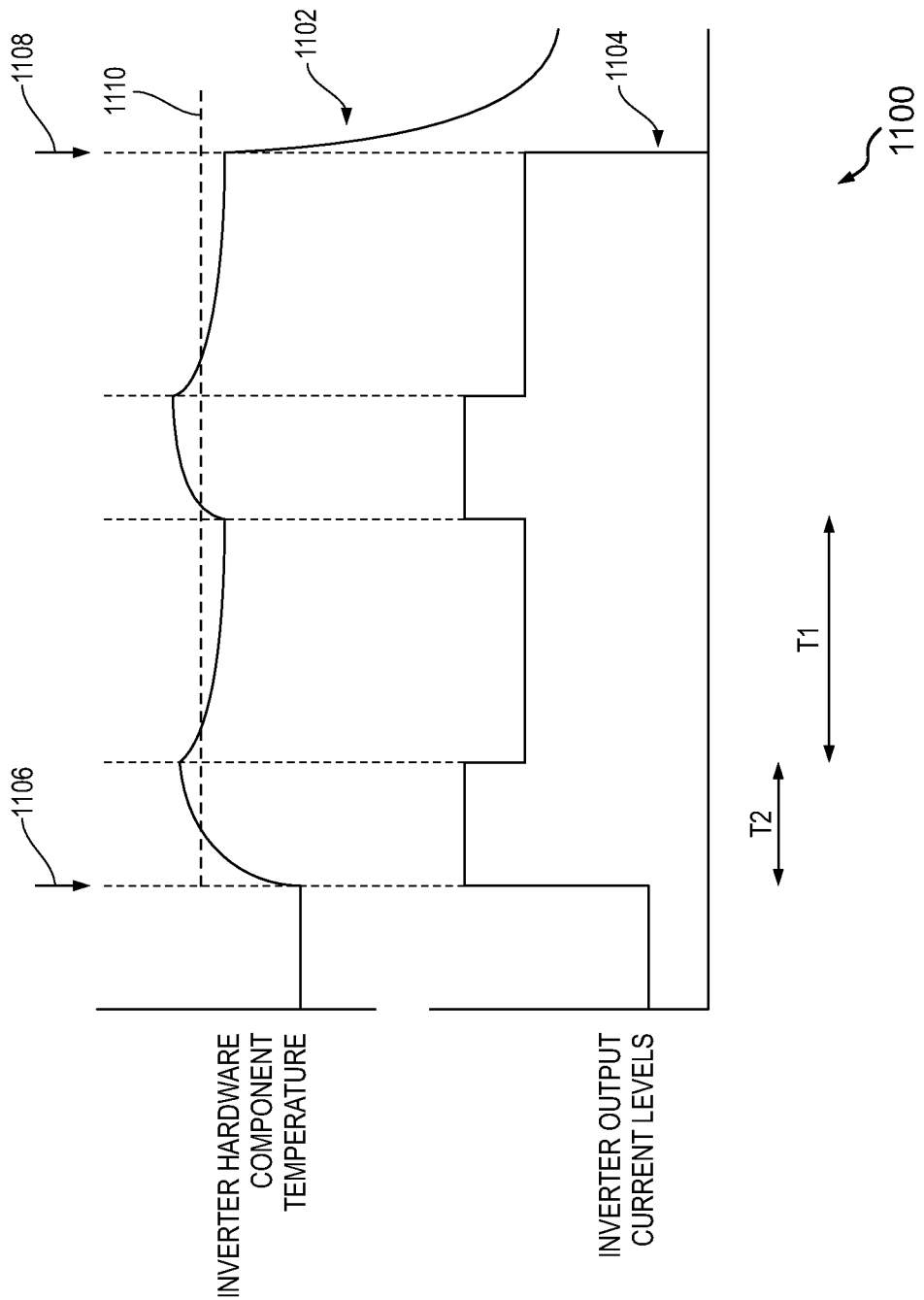
FIG. 11 illustrates a diagram showing a variation in component temperatures with a change in inverter module current levels during a short circuit condition, according to various embodiments of the present disclosure.

FIG. 11 illustrates waveform diagram 1100 showing a variation in component temperature 1102 with a change in inverter module current levels 1104 during a short circuit condition, according to various embodiments of the present disclosure. In an embodiment, to keep the component temperature under limits of those component max temps, a high current immediately after the fault (see, 1106) is recommended so that the fault can be cleared quickly. If it is not cleared in the first attempt, then it is tried again after T1. In this time duration T1, components will get cooled to safe levels to try again. Referring to FIG. 11, as the fault is cleared (see, 1108), the component temperature reduces to a desirable temperature value. Further, a horizontal dotted line (see, 1110) in FIG. 11, indicates an average component temperature during the fault.

Figure 12:
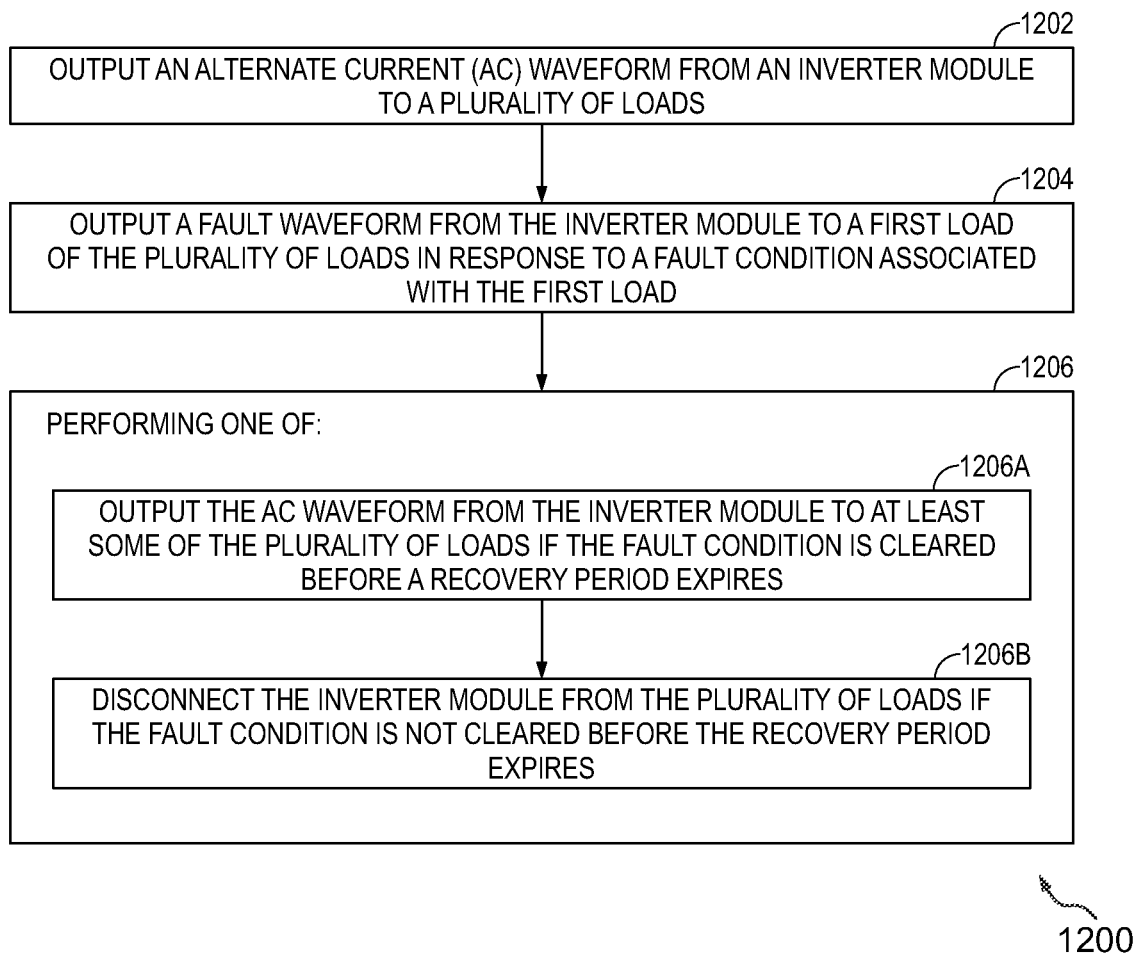
FIG. 12 is a flowchart illustrating a method for controlling fault current for an inverter-based microgrid, in accordance with an embodiment of the present disclosure.

FIG. 12 is a flowchart illustrating a method 1200 for controlling fault current for an inverter-based microgrid, in accordance with an embodiment of the present disclosure. The method 1200 depicted in the flow diagram may be executed by, for example, a master controller. Operations of the flow diagram of the method 1200, and combinations of operations in the flow diagram of the method 1200, may be implemented by, for example, hardware, firmware, a processor, circuitry, and/or a different device associated with the execution of software that includes one or more computer program instructions. The method 1200 starts at operation 1202.

At 1202, method 1200 includes outputting an alternating current (AC) waveform from an inverter module to a plurality of loads.

At 1204, the method 1200 includes outputting a fault waveform from the inverter module to a first load of the plurality of loads in response to a fault condition associated with the first load.

At 1206, the method 1200 includes performing one of two actions as indicated by 1206A and 1206B. At 1206A, the method 1200 includes outputting an AC waveform from the inverter module to at least some of the plurality of loads if the fault condition is cleared before a recovery period expires.

At 1206B, the method 1200 includes disconnecting the inverter module from the plurality of loads if the fault condition is not cleared before the recovery period expires.

Figure 13:
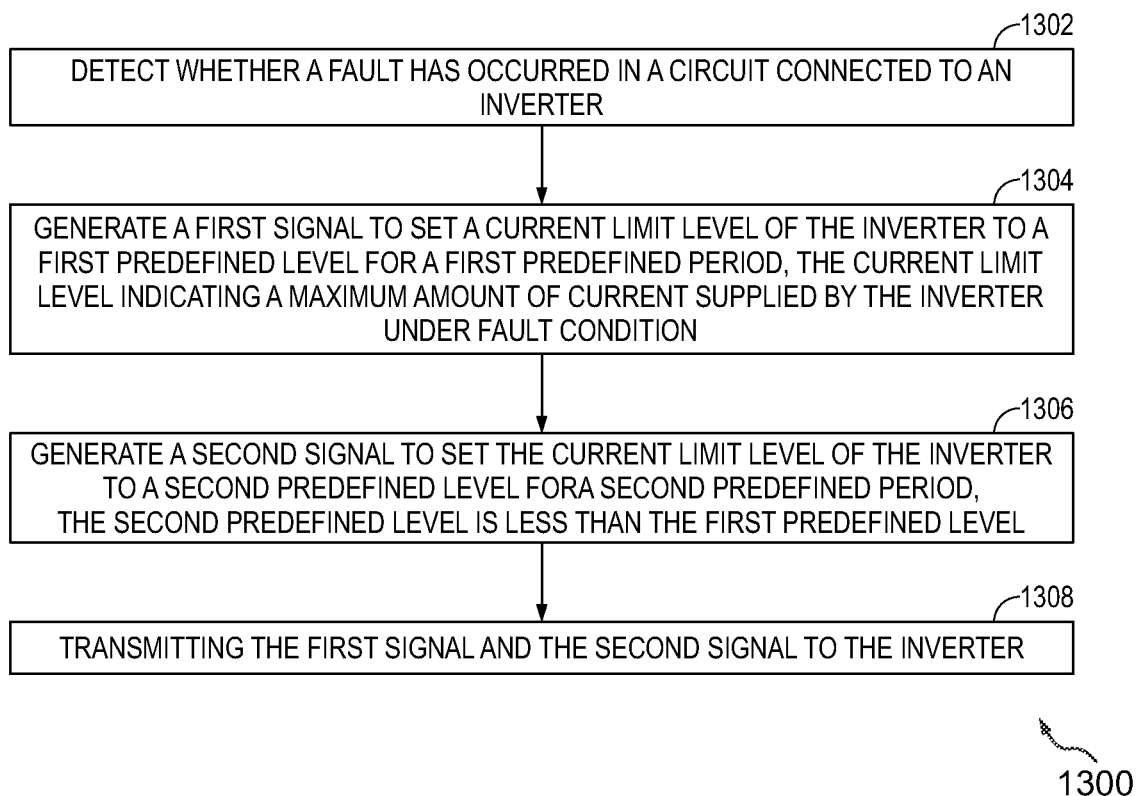
FIG. 13 is a flowchart illustrating a method performed by a controller, in accordance with an embodiment of the present disclosure.

FIG. 13 is a flowchart illustrating a method 1300 performed by a controller, in accordance with an embodiment of the present disclosure. The method 1300 depicted in the flow diagram may be executed by, for example, a master controller. Operations of the flow diagram of the method 1300, and combinations of operations in the flow diagram of the method 1300, may be implemented by, for example, hardware, firmware, a processor, circuitry, and/or a different device associated with the execution of software that includes one or more computer program instructions. The method 1300 starts at operation 1302.

At 1302, method 1300 includes detecting whether a fault has occurred in a circuit connected to an inverter.

At 1304, the method 1300 includes generating a first signal to set a current limit level of the inverter to a first predefined level for a first predefined period. The current limit level indicates a maximum amount of current supplied by the inverter under fault condition.

At 1306, the method 1300 includes generating a second signal to set the current limit level of the inverter to a second predefined level for a second predefined period, the second predefined level is less than the first predefined level.

At 1308, the method 1300 includes transmitting the first signal and the second signal to the inverter. The first signal may be sent immediately after the generation of the first signal. The second signal may be generated prior to transmission of the first signal or after transmission of the first signal. The inverter may include an inverter controller that receives the first and second signals, and accordingly, generates a duty cycle with a predefined time period. The inverter controller may then send a control signal with the generated duty cycle to the inverter to adjust the current supplied by the inverter.

The method 1300 may further include determining a count of consecutive instances when a current level of the inverter reaches the first predefined level. The method may also include transmitting a trip signal to the inverter if the count of the consecutive instances for the current level of the inverter exceeds a predetermined value, the trip signal facilitating tripping of the inverter from the electrical circuit.

The disclosed methods 1200 and 1300 with reference to FIGS. 12 and 13, respectively, or one or more operations of the methods 1200 and 1300 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, satellite, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

The construction and arrangements as shown in the various examples are illustrative only. Although only a few examples have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative examples. Other substitutions, modifications, changes, and omissions may also be made in the design, operating conditions, and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

Various embodiments of the disclosure, as discussed above, may be practiced with steps and/or operations in a different order, and/or with hardware elements in configurations, which are different from those which, are disclosed. Therefore, although the disclosure has been described based on these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
outputting an alternating current (AC) waveform from an inverter module to a plurality of loads;
outputting a fault waveform from the inverter module to a first load of the plurality of loads in response to a fault condition associated with the first load; and
performing one of:
outputting the AC waveform from the inverter module to at least some of the plurality of loads if the fault condition is cleared before a recovery period expires, and
disconnecting the inverter module from the plurality of loads if the fault condition is not cleared before the recovery period expires.

2. The method of claim 1, wherein outputting the fault waveform comprises:
outputting a first trip current at a first current level for a first time period;
outputting a second trip current at a second current level that is less than the first current level, for a second time period that is greater than the first time period; and
repeating the steps of outputting the first and the second trip current until the recovery period expires or the fault condition is cleared.

3. The method of claim 2, wherein:
the first time period ranges from one half of a current cycle to one current cycle; and
the first current level is 20% to 30% greater than the second current level.

4. The method of claim 2, further comprising:
determining if the recovery period expired by counting a number of times the first current level is reached; and
resetting the recovery period if the first current level is not reached during consecutive cycles of the fault waveform.

5. The method of claim 1, wherein the recovery period ranges from 1 second to 5 seconds.

6. The method of claim 1, wherein the fault condition comprises a short circuit associated with the first load.

7. The method of claim 6, wherein:
the step of outputting the fault waveform comprises outputting a trip current to a first overcurrent protection device (OCPD) associated with the first load; and
the fault condition is cleared before the recovery period expires when the trip current trips the first OCPD to electrically disconnect the first load from the inverter module.

8. The method of claim 7, wherein the step of outputting the AC waveform from the inverter module to at least some of the plurality of loads comprises outputting the AC waveform from the inverter module to a second load of the plurality of loads after the first load is electrically disconnected from the inverter module.

9. The method of claim 7, wherein the first OCPD comprises a circuit breaker and a relay that are electrically connected between the inverter module and the first load.

10. The method of claim 7, wherein the first OCPD comprises a fuse that is electrically connected between the inverter module and the first load.

11. The method of claim 1, wherein the fault condition comprises a current inrush.

12. The method of claim 11, wherein the step of outputting the AC waveform from the inverter module to at least some of the plurality of loads comprises outputting the AC waveform from the inverter module to the first load and to a second load of the plurality of loads after a magnitude of the current inrush drops below a magnitude of the fault waveform.

13. The method of claim 1, wherein the inverter module receives a direct current (DC) from a fuel cell system and outputs the AC waveform to the plurality of loads.

14. The method of claim 1, further comprising:
activating an energy reduction maintenance setting (ERMS) mode in response to receiving an ERMS signal; and
disconnecting the inverter module from the plurality of loads when the fault condition is detected while the ERMS mode is activated,
wherein the disconnecting the inverter module from the plurality of loads comprises disconnecting the inverter module within one half of a current cycle of detecting the fault condition, and
wherein the ERMS signal is generated in response to opening a door or access panel of the inverter module.

15. The method of claim 1, further comprising:
monitoring a magnitude of the AC waveform output from the inverter module to the plurality of the loads; and
detecting the fault condition based on the monitoring the magnitude of the AC waveform.

16. A system, comprising:
an inverter module;
a plurality of overcurrent protection devices (OCPD) electrically connected to the inverter module and configured to be connected to a respective load of a plurality of loads, wherein a first OCPD of the plurality of OCPDs is configured to be electrically connected to a first load of the plurality of loads; and
a controller configured to control the inverter module to:
output an alternating current (AC) waveform from the inverter module to the plurality of loads;
output a fault waveform from the inverter module to the first OCPD in response to a fault condition associated with the first load; and
output the AC waveform from the inverter module to at least some of the plurality of loads if the fault condition is cleared before a recovery period expires or disconnect the inverter module from the plurality of loads if the fault condition is not cleared before the recovery period expires.

17. The system of claim 16, wherein:

an input of the inverter module is configured to be electrically connected to a fuel cell system;

the plurality of overcurrent protection devices (OCPD) comprise circuit breakers or fuses;

the controller is configured to control the inverter module to output the fault waveform which comprises a trip current to the first OCPD; and the controller is configured to control the inverter module to clear the fault condition before the recovery period expires when the trip current trips the first OCPD to electrically disconnect the first load from the inverter module.

18. The system of claim 16, wherein:

the inverter module comprises a switch configured to be actuated by opening an access panel or door of the inverter module; and the controller is configured to activate an energy reduction maintenance setting (ERMS) mode in response to a signal from the switch indicating the opening of the access panel or door of the inverter module; and the controller is configured to disconnect the inverter module from the plurality of loads within one half of a current cycle of detecting the fault condition while the ERMS mode is activated.

19. A method performed by a controller, comprising:

detecting whether a fault has occurred in an electrical circuit connected to an inverter;

generating a first signal to set a current limit level of the inverter to a first predefined level for a first predefined period, the current limit level indicating a maximum amount of current supplied by the inverter under fault conditions;

generating a second signal to set the current limit level of the inverter to a second predefined level for a second predefined period, the second predefined level being less than the first predefined level; and transmitting the first signal and the second signal to the inverter.

20. The method as claimed in claim 19, further comprising:

determining a count of consecutive instances when a current level of the inverter reaches the first predefined level; and transmitting a trip signal to inverter if the count of the consecutive instances for the current level of the inverter exceeds a predetermined value, the trip signal facilitating tripping of the inverter from the electrical circuit.

* * * * *